(12) United States Patent
Tani et al.

(10) Patent No.: US 11,713,197 B2
(45) Date of Patent: Aug. 1, 2023

(54) PLATE MATERIAL CONVEYING SYSTEM

(71) Applicants: DAIWA ENGINEERING CO., LTD., Ibaraki (JP); DAIWA CAN COMPANY, Chiyoda-ku (JP)

(72) Inventors: Hideyuki Tani, Ibaraki (JP); Toshihisa Kasahara, Ibaraki (JP); Hidekazu Yoshioka, Ibaraki (JP); Hiroshi Nakamura, Ibaraki (JP)

(73) Assignees: DAIWA ENGINEERING CO., LTD., Ibaraki (JP); DAIWA CAN COMPANY, Chiyoda-ku (JP)

( * ) Notice: Subject to any disclaimer, the term of this patent is extended or adjusted under 35 U.S.C. 154(b) by 119 days.

(21) Appl. No.: 17/442,484

(22) PCT Filed: Mar. 4, 2020

(86) PCT No.: PCT/JP2020/009099
§ 371 (c)(1),
(2) Date: Sep. 23, 2021

(87) PCT Pub. No.: WO2020/195634
PCT Pub. Date: Oct. 1, 2020

(65) Prior Publication Data
US 2022/0153532 A1  May 19, 2022

(30) Foreign Application Priority Data
Mar. 25, 2019  (JP) ................................. 2019-056141

(51) Int. Cl.
*B65G 47/06* (2006.01)
*B65G 47/32* (2006.01)
*H01M 50/159* (2021.01)

(52) U.S. Cl.
CPC ............. *B65G 47/32* (2013.01); *B65G 47/06* (2013.01); *H01M 50/159* (2021.01)

(58) Field of Classification Search
CPC ................................ B65G 47/06; B65G 47/32
(Continued)

(56) References Cited

U.S. PATENT DOCUMENTS 4,199,050 A * 4/1980 Moller .................... B65B 61/28
53/247
4,951,803 A * 8/1990 Dorner ............... B65G 47/5113
198/463.6
(Continued)

FOREIGN PATENT DOCUMENTS

JP    2-40275 A    2/1990
JP    5-286522 A   11/1993
(Continued)

OTHER PUBLICATIONS

International Search Report dated Jun. 9, 2020 in PCT/JP2020/009099 filed on Mar. 4, 2020, 2 pages.

*Primary Examiner* — Douglas A Hess
(74) *Attorney, Agent, or Firm* — Oblon, McClelland, Maier & Neustadt, L.L.P.

(57) ABSTRACT

To provide a plate material conveying system configured to load plate materials produced by a press work onto a tray at regular intervals, prior to a cleaning process. The plate material conveying system comprises: a feeding section 13 that feeds the plate materials produced by the press work at regular intervals; a storage section 14 that stores the plate materials conveyed sequentially from the feeding section 13; a loading section 15 that loads the plate materials stored in the storage section 14 on the tray opposing thereto at one time; and a discharging section 16 that conveys the tray from a site to be opposed to the storage section 14 to a predetermined site.

6 Claims, 9 Drawing Sheets

(58) Field of Classification Search
USPC .......................................................... 198/426
See application file for complete search history.

(56) References Cited

U.S. PATENT DOCUMENTS

| | | | |
|---|---|---|---|
| 5,730,162 A | | 3/1998 | Shindo et al. |
| 6,575,178 B1* | | 6/2003 | Kamikawa ........ H01L 21/02054 |
| | | | 134/158 |
| 7,637,712 B2* | | 12/2009 | Varney .................... B07C 3/008 |
| | | | 414/795.2 |
| 7,686,153 B2* | | 3/2010 | Tsai ........................ B65G 57/10 |
| | | | 414/788.9 |
| 8,366,946 B2* | | 2/2013 | Ferguson .......... H01L 21/67346 |
| | | | 206/706 |
| 8,448,776 B2* | | 5/2013 | Papsdorf .............. B65G 47/082 |
| | | | 198/419.3 |
| 8,684,165 B2* | | 4/2014 | Follows ................. B65G 47/53 |
| | | | 198/570 |
| 9,187,243 B2 | | 11/2015 | Hashimoto et al. |
| 9,505,562 B2* | | 11/2016 | Petrovic ................. B65G 37/00 |
| 9,828,192 B2* | | 11/2017 | Baechle ................. B65B 5/068 |
| 11,299,353 B2* | | 4/2022 | Cofler .................. B65G 47/082 |
| 2012/0292223 A1 | | 11/2012 | Chenail et al. |
| 2013/0202394 A1 | | 8/2013 | Hashimoto et al. |

FOREIGN PATENT DOCUMENTS

| | | |
|---|---|---|
| JP | 8-195368 A | 7/1996 |
| JP | 3333634 B2 | 10/2002 |
| JP | 2012-46330 A | 3/2012 |
| JP | 2014-67664 A | 4/2014 |

* cited by examiner

PLATE MATERIAL CONVEYING SYSTEM

TECHNICAL FIELD

The present invention relates to a conveying system for conveying plate materials to a tray, loading the plate martials on the tray at regular intervals, and conveying the tray on which the plate materials are loaded to a desired destination.

BACKGROUND ART

A battery case in which an opening of a cylindrical main body is closed by attaching a sealing plate to the opening by a laser welding method is known in the art. The main body and the sealing plate are formed by pressing plate-like metallic blanks made of aluminum, and applying ironing and drawing to the pressed blanks. In order to carry out the pressing process smoothly, lubricant such as a lubrication oil or wax is applied to the metallic blanks. After the forming process, metallic dusts remain adhering to finished products though the lubricant. In order to remove the dust from the finished products, for example, the finished products are subjected to an ultrasonic cleaning process. Specifically, the finished products are immersed in cleaning fluid of hydrocarbon series, and defatted and cleaned ultrasonically. Thereafter, the finished products are subjected to a rinsing process and a drying process, and the cleaning process is completed.

If impurities such as Ca and Fe contained in the cleaning fluid used in the rinsing process remain adhering to the main body of the case and the sealing plate at the drying process, laser absorptivity in the laser welding process would be increased to cause a defect of welding. In order to avoid such disadvantage, according to the cleaning method described in Japanese Patent Laid-Open No. 2014-67664, a cleaning water whose conductivity is less than a predetermined value is used.

In order to efficiently clean up the above-mentioned products, it is preferable to clean and dry the products as many as possible at the one time. Japanese Patent Document No. 3333634 describes an aligning device that aligns metallic cans conveyed in a random manner to handle a plurality of cans at the same time. In the aligning device, a stopper is arranged on a conveyer to stop metallic cans being conveyed at a predetermined site, and the following cans come into contact to the cans stopped by the stopper. Eventually, an array of the aligned cans expands in a width direction of the conveyer to be lined up tightly according to an outline of each can.

SUMMARY OF INVENTION

Technical Problem to be Solved by the Invention

Thus, according to the teachings of Japanese Patent Laid-Open No. 2014-67664, the dusts adhering to the products are removed by the cleaning process and the drying process. However, if the cleaning fluid used in the cleaning process remains on the products, an adverse effect could be exerted on the products in subsequent steps to reduce quality of the products. Therefore, only the cleaning fluid that will not generate a harmful effect on the products in subsequent processes is used in the cleaning method taught by Japanese Patent Laid-Open No. 2014-67664. That is, according to the teachings of Japanese Patent Laid-Open No. 2014-67664, the cleaning fluid and the residues will not create an adverse effect in the subsequent processes. Such residue remaining after the cleaning process is also mentioned in Japanese Patent Document No. 3333634. As described, the aligning device taught by Japanese Patent Document No. 3333634 is adapted to handle a number of cans being contacted neatly to one another at the same time. Therefore, the dust generated during the pressing process and the cleaning fluid or solution used in the cleaning process would remain between the metallic cans. If such residues have a conductive property, for example, internal discharge would be caused in the battery described in Japanese Patent Laid-Open No. 2014-67664. As a result, defective batteries would be produced.

The present invention has been conceived noting the foregoing technical problems, and it is therefore an object of the present invention to provide a plate material conveying system configured to load plate materials produced by a press work onto a tray at regular intervals, prior to a cleaning process.

Means for Solving the Problem

According to the present invention, there is provided a plate material conveying system, in which a plurality of plate materials conveyed from a pressing section are aligned in array in the same orientation at regular intervals to be loaded into a tray, and in which the plate materials loaded into the tray are conveyed by conveying the tray. In order to achieve the above-explained objective, the plate material conveying system is provided with: a feeding section that feeds the plate materials from the array of the plate materials contacted to one another on a predetermined flat site one by one at regular intervals; and a storage section that has a plurality of shelves into which the plate materials conveyed sequentially from the feeding section are inserted, and that lifts one step in a direction perpendicular to a conveying direction of the feeding section to align an empty space of the shelf to the following plate material each time the plate material is inserted into the shelf. The tray comprises a plurality of support members into which side edges of the plate materials are inserted at same intervals as the plate materials stored in the shelf of the storage section. The plate material conveying system is further provided with: a loading section that loads the plate materials stored in the storage section on the tray at one time by opposing the tray to the storage section in which a predetermined number of the plate materials are stored, and by moving the storage section toward the tray; and a discharging section that conveys the tray on which the plate materials are loaded from a site to be opposed to the storage section to a predetermined site.

According to the present invention, the plate material conveying system may further comprise a tray conveying section including: a feeding hopper in which the empty trays are stacked; a conveyor belt that conveys the tray discharged from the feeding hopper to the storage section; and an erecting device that erects the tray to oppose the tray to the storage section.

According to the present invention, the loading section may comprise a pushing mechanism that pushes the plate materials loaded on the shelf of the storage section toward the tray opposed to the storage section at one time from an opposite side to the tray.

According to the present invention, the storage section may be configured to store the plate material by supporting the side edges of the plate material conveyed from the feeding section to the shelf, and lifting the shelf upwardly one step.

According to the present invention, the tray may comprise a plurality of shelves to store the plate materials, and same number of the feeding sections and the storage sections as the shelves of the tray are arranged. The feeding section may comprise a loading device that loads predetermined number of the plate materials conveyed from the pressing section onto the storage sections alternately, and the discharging section may comprise a sliding mechanism that moves the tray in which the plate materials are loaded into one of the shelves from one of the storage sections to a site to be opposed to the other one of the storage sections.

According to the present invention, the support member of the tray may include a rack bar having a groove into which the side edge of the plate material is inserted. The tray may comprise an opening formed on an opposite side to the storage section at a site corresponding to a longitudinally intermediate portion of the plate materials in which both side edges are inserted into the grooves. One end of the groove opposed to the storage section may be open, and the other end of the groove opposite to the storage section may be closed.

Advantageous Effects of Invention

According to the present invention, the plate materials formed by a pressing method are conveyed one by one to the shelf of the storage section, and the shelf is moved one pitch each time the plate material is inserted to the shelf. The plate materials loaded into the shelf is transferred to the tray opposed to the storage section at one time. As a result, the plate materials are stored in the tray at regular intervals. For this reason, in a washing tank, cleaning fluid is allowed to flow through clearances between the plate materials stored in the tray to remove metallic dusts effectively from the plate materials. In addition, in a drying process, the cleaning fluid adhering to the plate materials by surface tension may be eliminated effectively. As a result, the plate materials can be maintained to the same quality. Further, since a plurality of the plate materials are stored in the tray, a plurality of the sealing plates can be washed at one time. For this reason, a cost and man-hour for manufacturing the plate materials can be reduced, and the plate materials can be manufactured in mass quantities.

DESCRIPTION OF EMBODIMENT(S)

Figure 1:
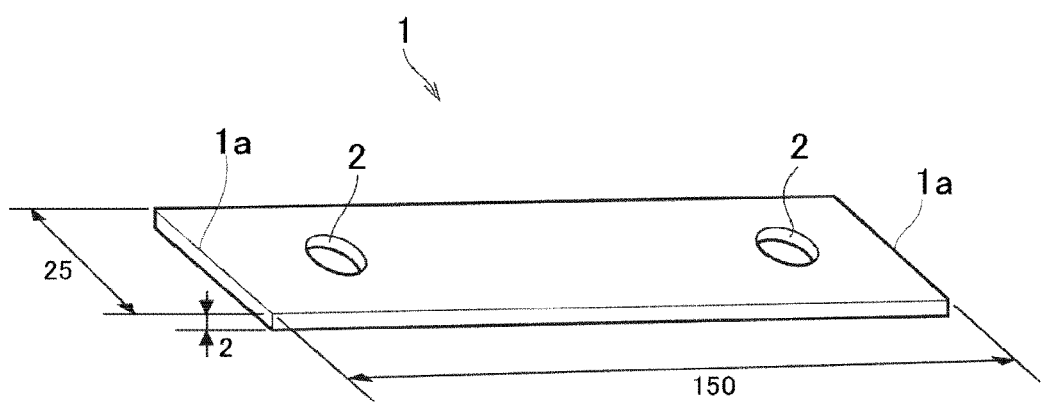
FIG. 1 is a perspective view showing one example of a plate material according to the present invention.

FIG. 1 is a perspective view showing one example of a structure of a plate material to which the present invention is applied. The plate material shown in FIG. 1 is a sealing plate 1 made of metallic material such as aluminum alloy. For example, the sealing plate 1 is attached to a container of a lithium-ion battery by a laser welding method to close an opening of the container in a liquid-tight manner.

A thickness of the sealing plate 1 is relatively thin, therefore, the sealing plate 1 is formed by pressing a plate blank of aluminum alloy while forming a through hole 2 to which an electrode is attached simultaneously. In order to reduce sliding resistances of a punch and a die to carry out the pressing process smoothly, lubrication oil such as mineral oil is applied to the blank. Therefore, in order to remove the lubrication oil applied to the sealing plate 1 and metallic dusts adhering inevitably to the sealing plate 1 during the pressing process, the sealing plate 1 is subjected to a washing process after the pressing process. For example, a size of the sealing plate 1 is 150×25 mm, and a thickness of the sealing plate 1 is 2 mm.

For example, the sealing plate 1 may be cleaned by ultrasound in cleaning fluid of hydrocarbon series held in a washing tank, or by spraying cleaning fluid to the sealing plate 1.

Figure 2:
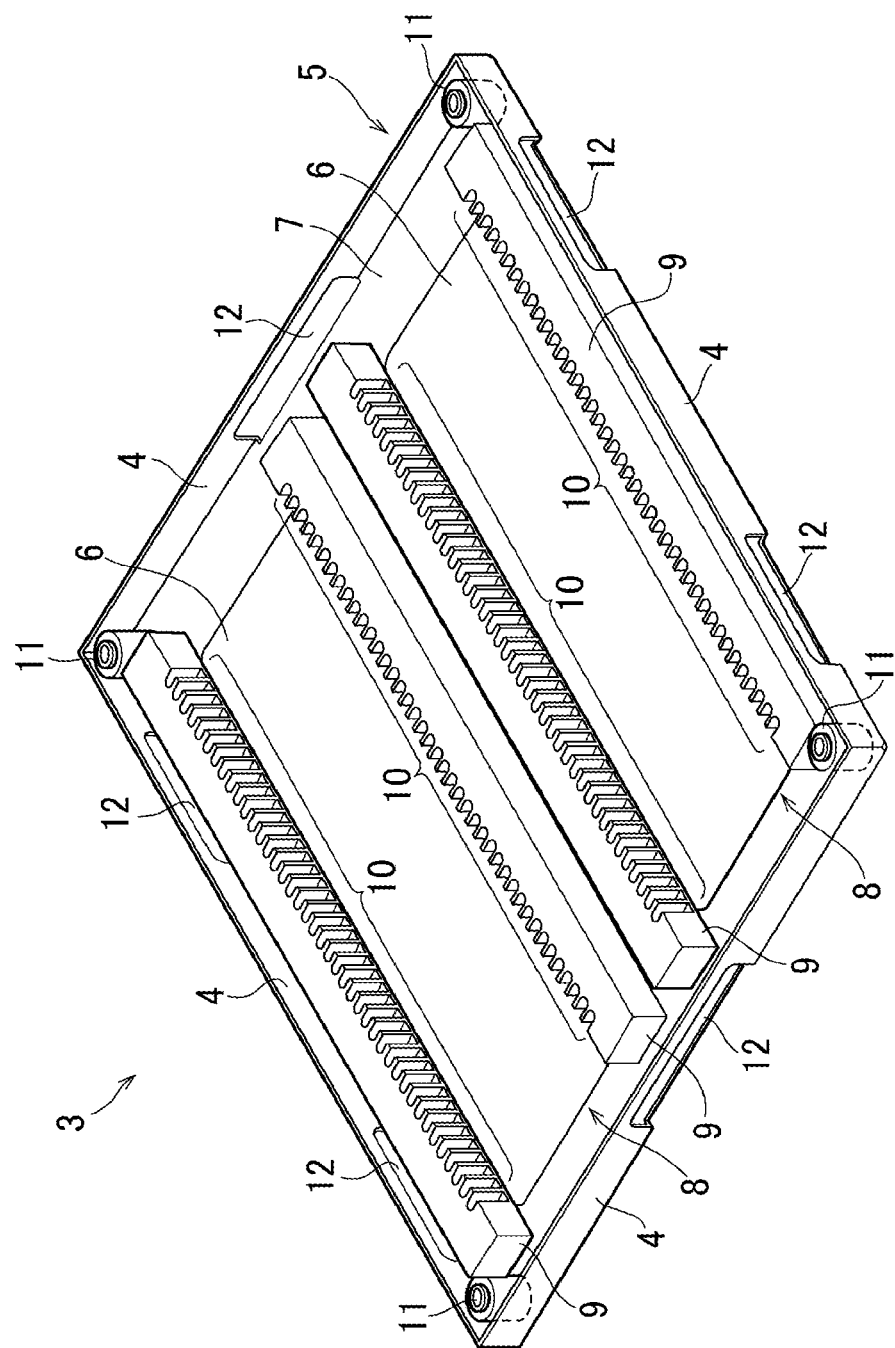
FIG. 2 is a perspective view showing one example of a tray according to the embodiment of the present invention.

In the washing process, it is preferable to wash a plurality of the plate materials 1 at the one time. To this end, according to the present invention, a plurality of the sealing plates 1 are loaded on a tray. FIG. 2 is a perspective view showing one example of a structure of the tray.

According to the example shown in FIG. 2, a rectangular frame 5 is formed by orthogonally combining bar members 4 made of stainless. Each of the bar members 4 is an angle member having an L-shaped cross-section, and individually arranged in such a manner that a horizontal portion is oriented inwardly of the frame 5. A back plate 7 is welded to a bottom surface of the horizontal portions of the bar members 4, and an opening 6 is formed on the back plate 7.

A shelf 8 is formed inside of the frame 5, and in the shelf 8, a plurality of the sealing plates 1 are juxtaposed in the same orientation at regular intervals. In order to form the shelf 8, a pair of rack bars 9 are attached to the back plate 7 in a parallel manner while maintaining a clearance therebetween which is slightly shorter than a length of the sealing plate 1.

A plurality of U-shaped grooves 10 are formed on surfaces of the rack bars 9 opposing to each other at regular intervals in a longitudinal direction so that side edges 1a of the sealing plate 1 are inserted into the U-shaped grooves 10. A width of each of the U-shaped grooves 10 is slightly wider than the thickness of the sealing plate 1, and a length of each of the U-shaped grooves 10 is longer than the width of the sealing plate 1. In the shelf 8, therefore, the sealing plates 1 are held in the U-shaped grooves 10 in the same orientation at regular intervals. Accordingly, the rack bar 9 serves as a "support member" of the embodiment of the present invention.

The tray 3 shown in FIG. 2 is conveyed in a horizontal posture while situating the back plate 7 at the bottom to be put into the washing tank. Therefore, in order to support the sealing plates 1 held in the U-shaped grooves 10, one end of each of the U-shaped grooves 10 to which the back plate 7 is attached is closed. The other end of each of the U-shaped grooves 10 opposite to the back plate 7 is open so that the sealing plates 1 may be inserted into the U-shaped grooves 10 through openings of the U-shaped grooves 10 from an after-mentioned storage. In the tray 3 shown in FIG. 2, a width thereof is sufficiently longer than the length of the sealing plate 1, therefore, two rows of shelves 8 are formed in parallel in the width direction.

Figure 3:
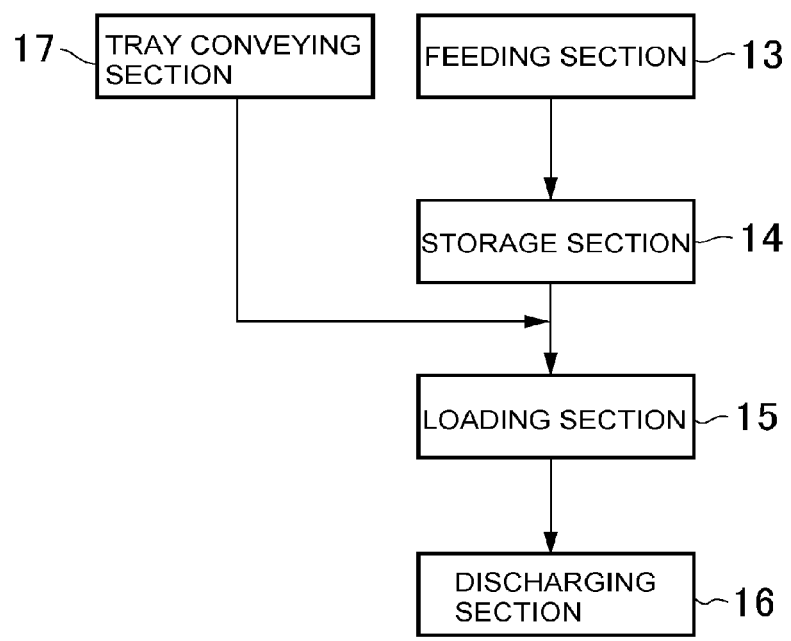
FIG. 3 is a conceptual diagram showing one example of a structure of the conveying system according to the present invention.

According to the example shown in FIG. 3, a positioning hole 11 is formed in each corner of the tray 3 so that the after-mentioned storage may be positioned with respect to the tray 3 when opposed to the tray 3. In addition, in order to reduce a flow resistance of the cleaning fluid, a plurality of apertures 12 are formed on an outer wall of the frame 5.

As described, according to the present invention, a plurality of the sealing plates 1 formed by the press work are conveyed automatically to be inserted into the tray 3 sequentially. One example of a structure of the conveying system is schematically shown in FIG. 3. According to the example shown in FIG. 3, the conveying system comprises: a feeding section 13 that aligns the sealing plates 1 conveyed from a pressing section in array on a flat site, and feeds the sealing plates 1 from the array of sealing plates 1 one by one at regular intervals; a storage section 14 that stores the sealing plates 1 sequentially conveyed from the feeding section 13 at regular intervals; a loading section 15 that loads the sealing plates 1 stored in the storage section 14 on the tray 3; and a discharging section 16 that conveys the tray 3 on which the sealing plates 1 are loaded to a predetermined site. According to the example shown in FIG. 3, the conveying system further comprises a tray conveying section 17 that conveys the empty trays 3 on which the sealing plates 1 have not yet been loaded to the loading section 15 at which the sealing plates 1 are loaded on the tray 3. The tray conveying section 17 conveys the empty trays 3 simultaneously with feeding the sealing plates 1 by the feeding section 13 and storing the sealing plates 1 in the storage section 14.

Figure 4:
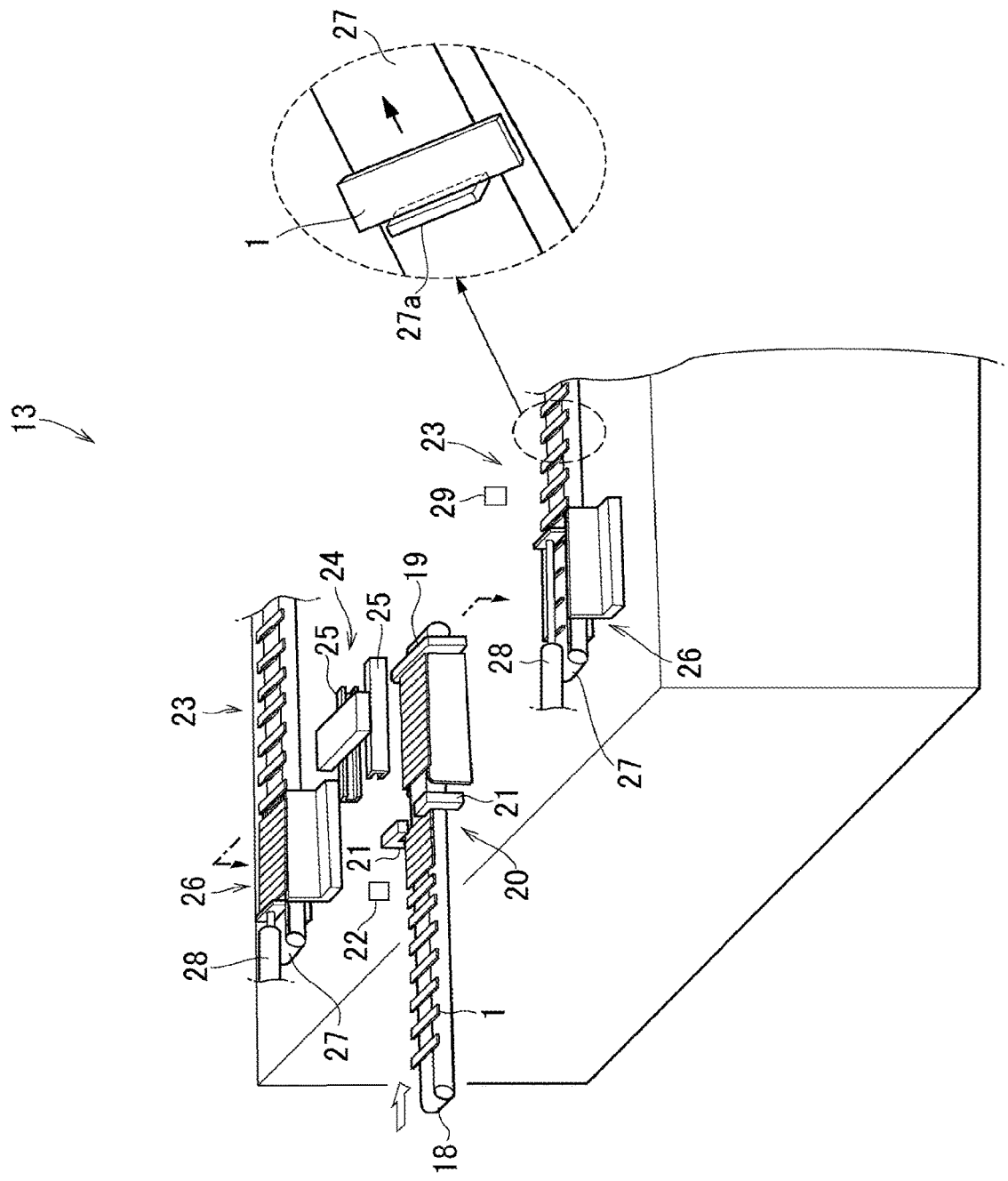
FIG. 4 is a schematic illustration showing one example of a feeding section.

One example of a structure of the feeding section 13 is shown in FIG. 4. In the feeding section 13, first of all, the sealing plates 1 formed by the press work are aligned on a flat site while being contacted to one another. Specifically, the feeding section 13 comprises a conveyor belt 18 connected to the pressing section, and the sealing plate 1 is loaded laterally on the conveyor belt 18 in such a manner that a longer side of the sealing plate 1 extends in the width direction of the conveyor belt 18. The sealing plates 1 conveyed from the pressing section have not yet been aligned and distances among the sealing plates 1 are not constant.

In other to align the sealing plates 1 conveyed from the pressing section while contacting to one another, a stopper 19 is disposed at a front end of the conveyor belt 18 in a conveying direction to stop the progress of the leading sealing plate 1. Specifically, the stopper 19 is arranged perpendicular to the conveying direction of the conveyor belt 18 so that the leading sealing plate 1 comes into contact to the stopper 19. Consequently, a posture of the leading sealing plate 1 is changed in such a manner that the longer side of the sealing plate 1 extends perpendicular to the conveying direction of the conveyor belt 18. Then, the following sealing plate 1 comes into contact to the leading sealing plate 1 so that a posture of the following sealing plate 1 is changed as that of the leading sealing plate 1. As a result, the sealing plates 1 are aligned in the thickness direction of the sealing plates 1.

In order to form an array of predetermined number of sealing plates 1, according to the example shown in FIG. 4, another stopper 20 is also disposed on the conveyor belt 18. That is, when the predetermined number of the sealing plates 1 are aligned, the sealing plate 1 brought into contact to the sealing plate 1 at the end of the array of sealing plates 1 is stopped by another stopper 20. Specifically, another stopper comprises a pair of stopping bars 21 arranged across the conveyor belt 18. A clearance between the stopping bars 21 may be adjusted by a not shown actuator. That is, the clearance between the stopping bars 21 may be widened to situate the stopping bars 21 at a standby position. In this case, the sealing plate 1 is allowed to pass through another stopper 20. By contrast, the clearance between the stopping bars 21 may also be narrowed to situate the stopping bars 21 at a stopping position. In this case, the sealing plate 1 is not allowed to pass through another stopper 20. Specifically, after aligning predetermined number of the sealing plates 1, the stopping bars 21 are moved to the stopping position so that both ends of the sealing plate 1 being conveyed toward the array of sealing plates 1 are stopped by the stopping bars 21. Number of the sealing plates 1 passing through a predetermined position may be detected and counted by a sensor 22 including an optical sensor and a contact type sensor, and the stopping bars 21 are actuated based on a detection signal transmitted from the sensor 22.

According to the example shown in FIG. 4, the array of sealing plates 1 contacted to one another is carried into conveying lanes 23 extending both sides of the conveyor belt 18. That is, same number of conveying lanes 23 as the shelves 8 of the tray 3 are arranged. The array of sealing plates 1 conveyed by one of the conveying lanes 23 is loaded into one of the shelves 8, and the array of sealing plates 1 conveyed by the other one of the conveying lanes 23 is loaded into another one of the shelves 8.

According to the example shown in FIG. 4, the array of the predetermined number of sealing plates 1 being stopped by the stopper 19 is slightly moved forward by slightly advancing the stopper 19 in the conveying direction of the conveyor belt 18. Then, side ends of the array of sealing plates 1 are clamped by clamps 25 of a crane 24. The array of the sealing plates 1 clamped by the clamps 25 is lifted by the crane 24, and loaded onto a rail 26 arranged on both sides of one of the conveying lanes 23. Thereafter, the array of sealing plates 1 formed again on the conveyor belt 18 is loaded onto the rail 26 arranged on both sides of the other one of the conveying lanes 23 by the above-explained procedures. As a result, the arrays of sealing plates 1 are loaded alternately onto the right conveying lane 23 and the left conveying lane 23. Thus, the crane 24 serves as a "loading device" of the embodiment of the present invention.

Then, the sealing plates 1 is further conveyed from the array of sealing plates 1 loaded on the rail 26 one by one at regular intervals. To this end, according to the example shown in FIG. 4, a conveyor belt 27 is arranged between the rail 26 at a lower level than the rail 26. Specifically, the conveyor belt 27 is arranged in such a manner as to advance in a direction perpendicular to the longitudinal direction of the sealing plate 1. The sealing plate 1 at the end of the array of sealing plates 1 loaded on the rail 26 is pushed by a pusher 28 toward the conveyor belt 27. The pusher 28 is actuated by an electric piston or a hydraulic piston.

The pusher 28 is adapted to push the sealing plate 1 at regular intervals synchronously with a moving speed of crosspieces 27a arranged on the conveyor belt 27 at regular intervals. That is, the sealing plates 1 are loaded sequentially on the conveyor belt 27 between the crosspieces 27a. In addition, according to the example shown in FIG. 4, an optical sensor 29 is arranged to detect the sealing plate 1 loaded between the crosspieces 27a.

For example, it is preferable to contact a float type contact member to the sealing plate 1 loaded on the conveyor belt 27. That is, it is preferable to apply a resistance force to the sealing plate 1 being conveyed by the conveyor belt 27 thereby bringing the sealing plate 1 into contact to the following crosspiece 27a to adjust a posture of the sealing plate 1.

Figure 5:
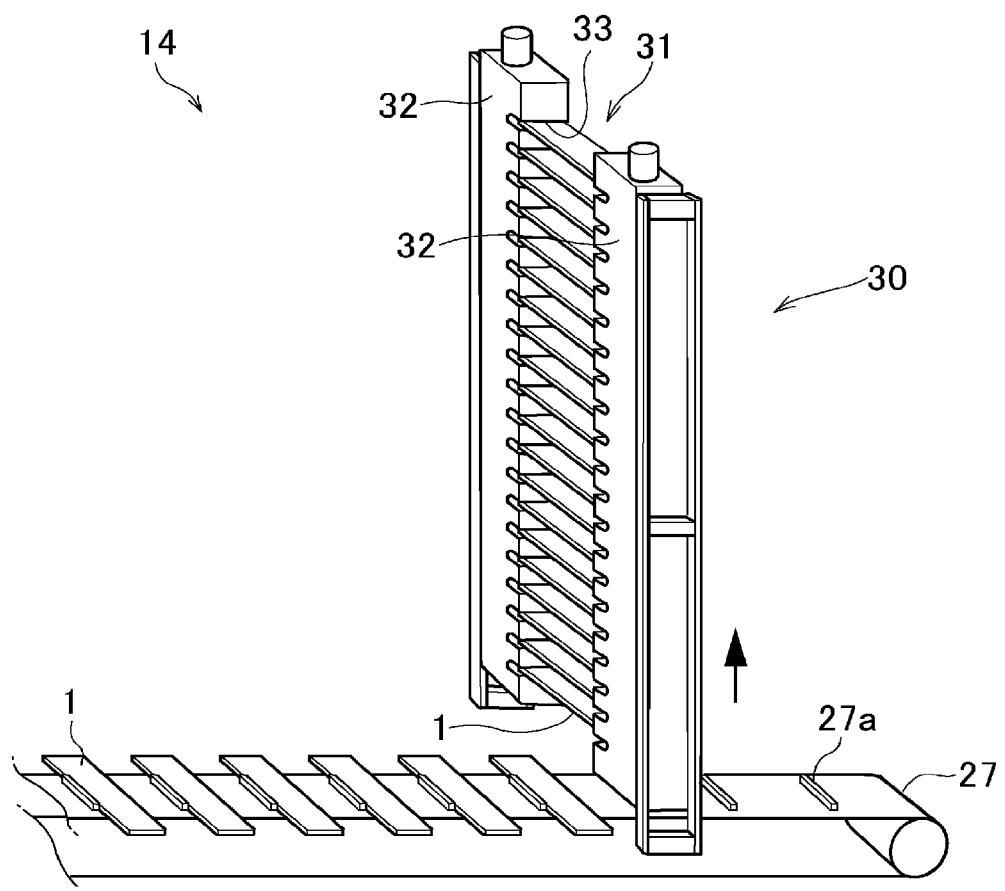
FIG. 5 is a schematic illustration showing one example of a storage section.

The sealing plates 1 conveyed sequentially by the feeding section 13 are stored in the storage section 14 at regular intervals. One example of a structure of the storage section 14 is shown in FIG. 5, and the storage section 14 comprises a storage 30 that stores the sealing plates 1. As the shelf 8 of the tray 3, the storage 30 comprises a shelf 31 that stores the sealing plates 1 at regular intervals in the thickness direction of the sealing plate 1. Specifically, the shelf 31 comprises a pair of rack bars 32 each of which has a similar structure as the rack bar 9 of the shelf 8, and the conveyor belt 27 advances between the rack bars 32. Each of the rack bars 32 has a plurality of grooves 33 individually penetrating thorough the rack bar 32 in the conveying direction of the conveyor belt 27.

The storage 30 is allowed to move in a direction perpendicular to the conveying direction of the conveyor belt 27. According to the example shown in FIG. 5, specifically, the storage 30 is allowed to reciprocate in the vertical direction. If the sealing plates 1 have not yet been loaded into the storage 30, the storage 30 is moved to the lowest position as an initial position so that the top groove 33 of the rack bar 32 is situated at a same level as the sealing plate 1 on the conveyor belt 27.

When the storage 30 is situated at the initial position, therefore, both ends of the sealing plate 1 being conveyed by the conveyor belt 27 to the storage 30 are inserted into the top grooves 33 of the right rack bar 32 and the left rack bar 32. For this purpose, a width of the conveyor belt 27 is set narrower than the width of the sealing plate 1 so that both ends of the sealing plate 1 protrude from the conveyor belt 27 in the width direction.

After the sealing plate 1 is inserted into the top grooves 33 of the rack bars 32, the conveyor belt 27 is temporarily stopped, and the storage 30 is lifted one step. As a result, the sealing plate 1 is transferred from the conveyor belt 27 to the shelf 31 of the storage 30, and the empty grooves 33 second from the top is aligned to the following sealing plate 1 being conveyed by the conveyor belt 27. That is, the empty grooves 33 second from the top is lifted to a level at which the following sealing plate 1 is situated.

Consequently, the sealing plates 1 are loaded sequentially into the storage 30 by lifting the storage 30 synchronously with the conveyor belt 27. Otherwise, if an empty spot of the conveyor belt 27 on which the sealing plate 1 is not loaded is detected by the sensor 29, escalation of the storage 30 may be stopped temporarily at a timing when the empty spot of the conveyor belt 27 passes through the storage 30. In this case, therefore, empty grooves 33 will not remain in the rack bars 32 of the storage 30. When the sealing plates 1 are inserted into all the grooves 33 of the storage 30, the conveyor belt 27 is stopped, and the sealing plates 1 are transferred from the storage 30 to the tray 3. Then, the empty storage 30 is moved downwardly to the initial position again, and the conveyor belt 27 is moved again. Here, in order to prevent the sealing plates 1 from being unloaded inertially when moving or stopping the storage 30, it is preferable to actuate the storage 30 by e.g., a servo motor which rotates smoothly.

Figure 6:
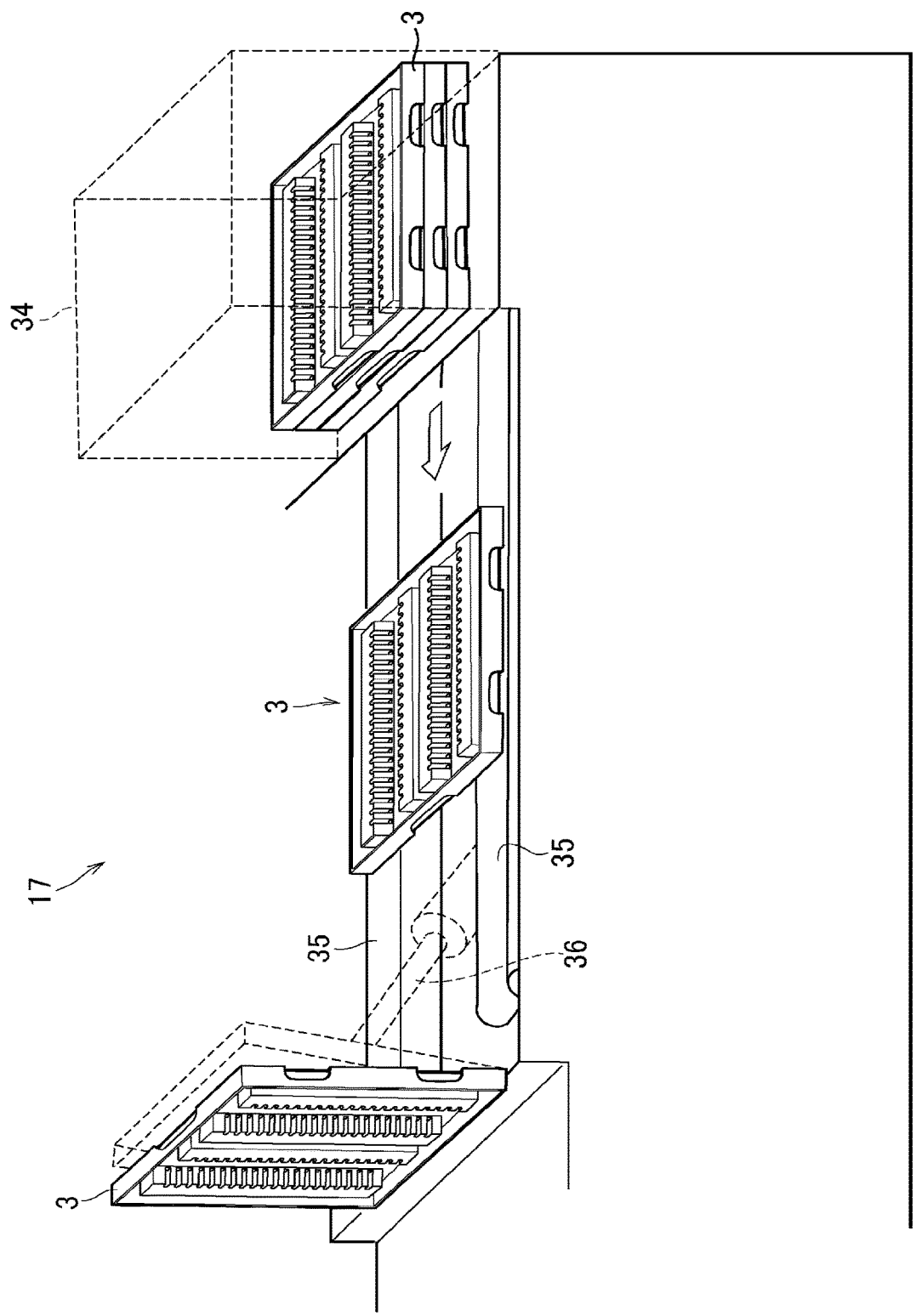
FIG. 6 is a schematic illustration showing one example of a tray conveying section.

Thus, the sealing plates 1 are loaded into the storage 30 through the feeding section 13 and the storage section 14, and the empty tray 3 that has not yet stored the sealing plates 1 therein is transported to a site to be opposed to the storage 30. A structure of the tray conveying section 17 is shown in FIG. 6. According to the example shown in FIG. 6, the tray conveying section 17 comprises a feeding hopper 34 in which the empty trays 3 are stacked. The feeding hopper 34 has a not shown supply port formed on a lower side wall, and a width of the supply port is slightly wider than a thickness of the tray 3. Therefore, the lowest tray 3 in the stack can be pushed out of the feeding hopper 34 through the supply port.

The supply port is connected to a pair of conveyor belts 35 so that the tray 3 discharged from the supply port is conveyed by the conveyor belts 35 while being supported at both ends by the conveyor belts 35. To this end, the conveyor belts 35 are arranged parallel to each other, and a clearance between the conveyor belts 35 is slightly narrower than the width of the tray 3.

A not shown stopper is disposed at the forefront of the conveyor belts 35, and the conveyor belts 35 are stopped when the tray 3 is conveyed to the stopper. Then, the tray 3 is pushed up by an arm 36 to be erected from between the conveyor belts 35. Specifically, the arm 36 is actuated by an air cylinder so that a leading end of the arm 36 pushes the back plate 7 to erect the tray 3. In order not to fall the erected tray 3, it is preferable to arrange a not shown clamping device at the leading end of the arm 36 to hold the tray 3.

Figure 7:
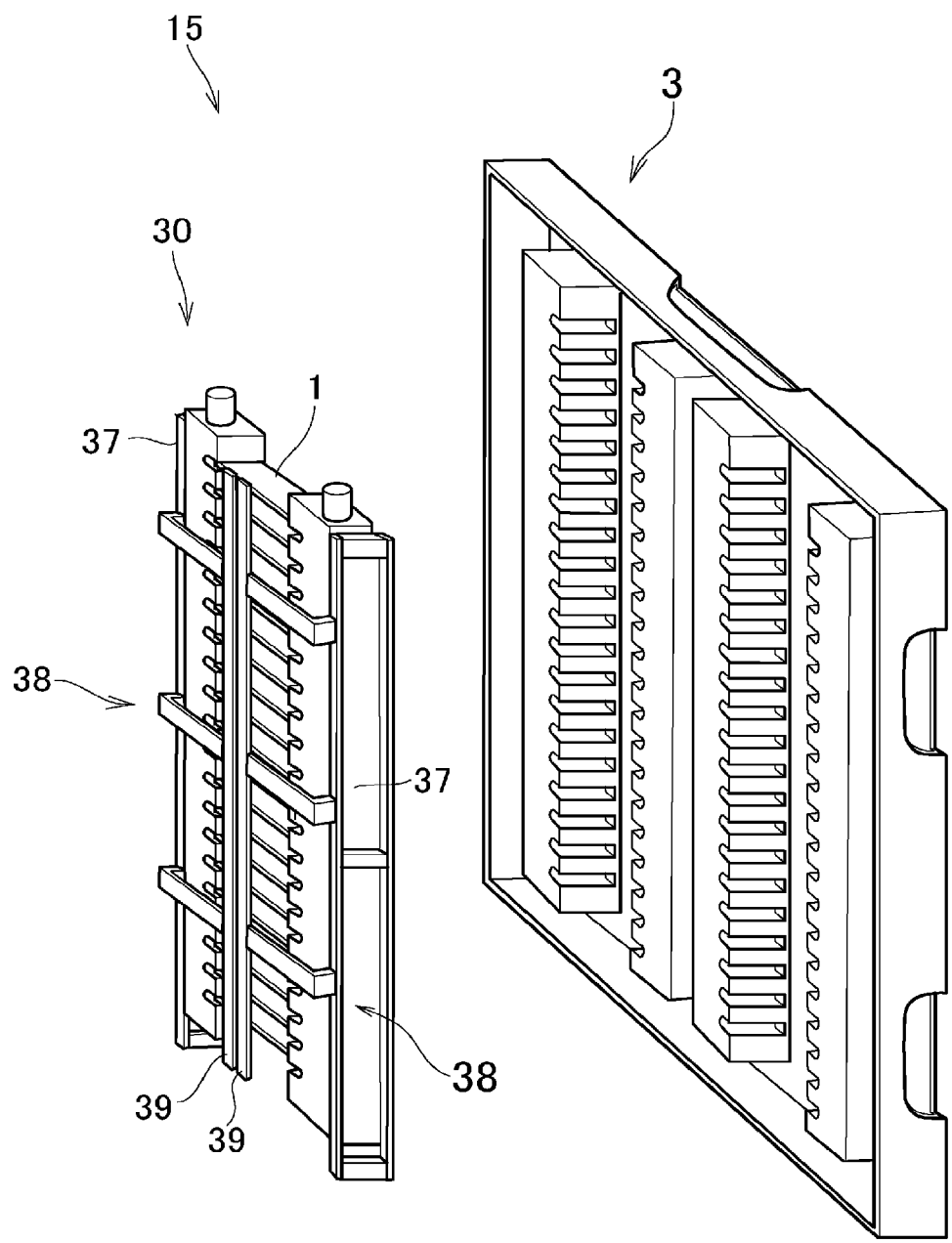
FIG. 7 is a schematic illustration showing one example of a loading section.

Turning to FIG. 7, there is shown a structure of the loading section 15 that loads the sealing plates 1 stored in the storage 30 into the tray 3. According to the example shown in FIG. 7, in the loading section 15, the storage 30 is situated to be opposed to the tray 3, and in this situation, the storage 30 is moved toward the tray 3. The storage 30 is provided with pins to be inserted individually into the positioning holes 11 of the tray 3 so that the shelf 8 of the tray 3 will not be misaligned with the shelf 31 of the storage 30.

After situating the storage 30 to be opposed to the tray 3, the sealing plates 1 stored in the storage 30 are transferred to the tray 3. To this end, the storage 30 is provided with a rotary pusher 38 comprising a pair of side bar members 37, and a pair of pushing members 39 individually connected to the side bar members. Specifically, each of the side bar members 37 is rotated by a not shown motor around a longitudinal side rod of the storage 30, and each of the pushing members 39 has a substantially same length as the shelf 31. When the side bar members 37 are rotated, the sealing plates 1 stored in the storage 30 are pushed out of the storage 30 toward the tray 3 by the pushing members 39 from the back. Accordingly, the rotary pusher 38 serves as a "pushing mechanism" of the embodiment of the present invention. Instead of the rotary pusher 38, a reciprocating mechanism may also be adopted as the pushing mechanism to push the sealing plates 1 stored in the storage 30 toward the tray 3 from the back.

As described, a plurality of shelves 8 are formed in the tray 3 shown in FIG. 2, and same number of the conveying lanes 23 as the shelves 8 are arranged in the feeding section 13 shown in FIG. 4. The array of sealing plates 1 loaded onto one of the rails 26 is loaded into one of the shelves 8 of the tray 3, and the array of sealing plates 1 loaded onto the other one of the rails 26 is loaded into the other one of the shelves 8 of the tray 3. To this end, after loading the sealing plates 1 into one of the shelves 8 from the rail 26 of one of the conveying lanes 23, the tray 3 is moved to the other one of the conveying lanes 23 to receive the sealing plates 1 from the rail 26.

Figure 8:
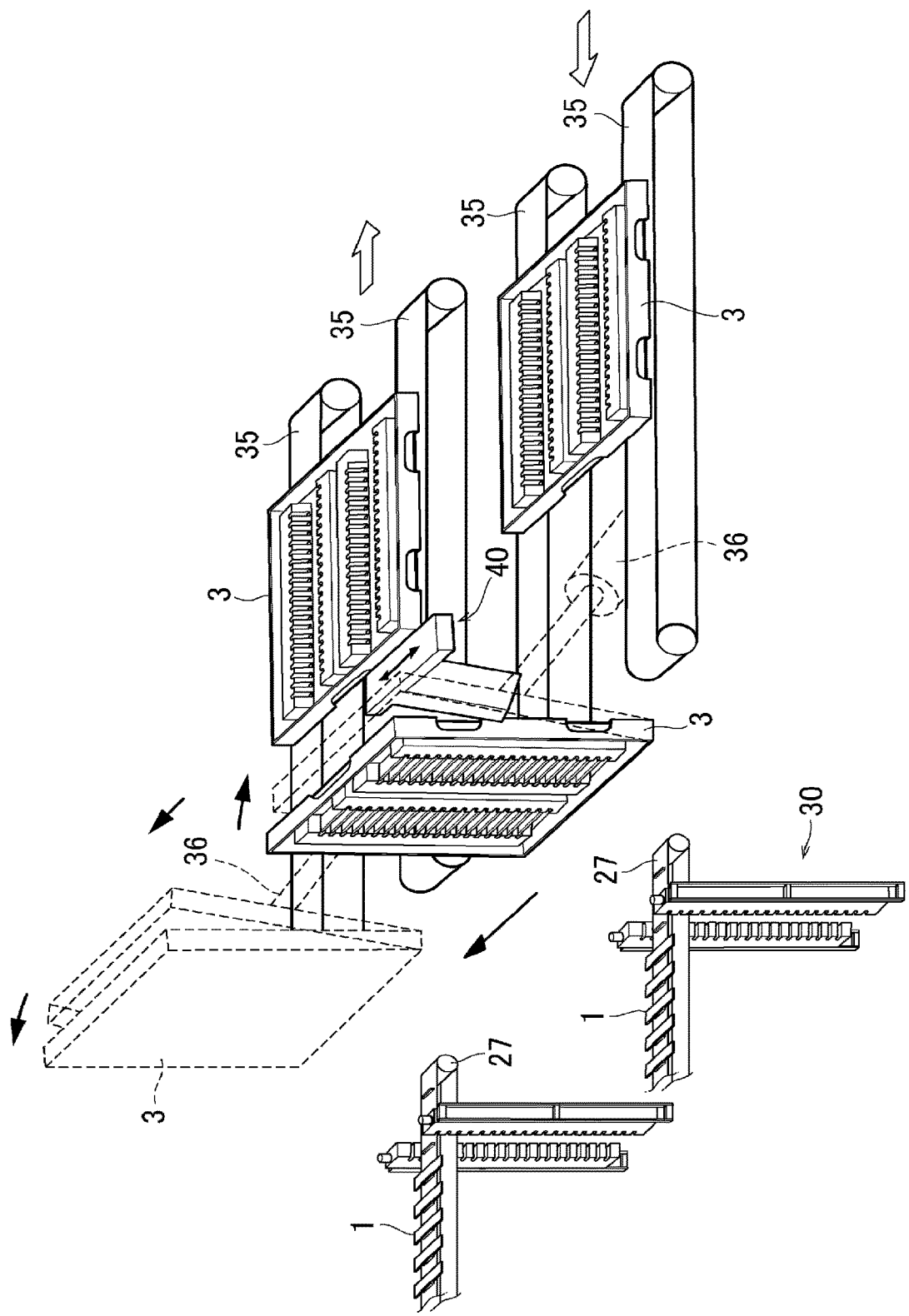
FIG. 8 is a schematic illustration showing one example of a sliding mechanism.

In this situation, in order not to drop the sealing plates 1 to be loaded into the tray 3, the tray 3 conveyed to one of the conveying trays 23 is erected by the arm 36 while being tilted at approximately 10 degrees as depicted by the dashed lines in FIG. 8. Specifically, the tray 3 is supported by the arm 36 in such a manner that a surface of the tray 3 from which the sealing plates 1 are inserted is oriented upwardly.

The tray 3 tilted as depicted in FIG. 8 is pushed toward the other one of the conveying lanes 23 by a sliding mechanism 40 from the side. The sliding mechanism 40 is actuated by e.g., an electromagnetic actuator to slide along a not shown guide lane. Specifically, after tilting the tray 3, the tray is unclamped from the arm 36, and pushed toward the other one of the conveying lanes 23 by the sliding mechanism 40 from the side. In order not to bring the tray 3 being pushed into contact to an edge of the arm 36 arranged in the other one of the conveying lanes 23, it is preferable to arrange a guide plate supporting the back plate 7 of the tray 3 along a sliding direction of the tray 3.

When the tray 3 is moved to the arm 36 arranged in the other one of the conveying lanes 23, the tray 3 is clamped by the clamping device of the arm 36, and erected to be opposed to the storage 30 of the other one of the conveying lanes 23. Then, the sealing plates 1 are loaded into the other one of the shelves 8 of the tray 3 from the storage 30.

Figure 9:
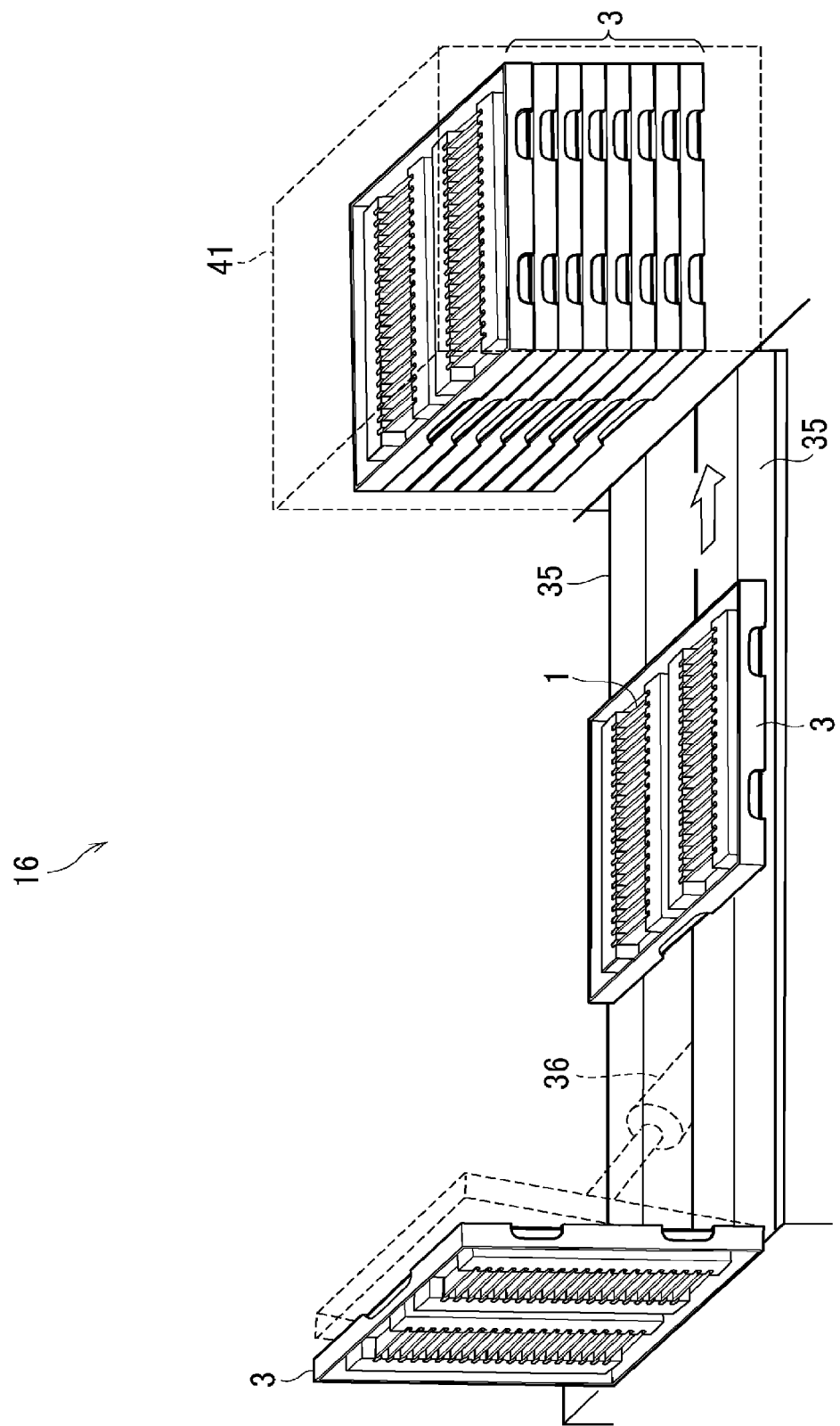
FIG. 9 is a schematic illustration showing one example of a discharging section.

After loading the sealing plates 1 into both of the shelves 8 of the tray 3, as shown in FIG. 9, the tray 3 is stored in a discharging hopper 41 of the discharging section 16. Specifically, after the sealing plates 1 are loaded into the tray 3 from the storage 30, the arm 36 is withdrawn to bring down the tray 3 in a horizontal fashion. In this situation, while the arm 36 is withdrawn, or when the tray 3 is horizontalized, the tray 3 is unclamped. Consequently, the tray 3 is laid on the conveyor belts 35 having same structure as those of the tray conveying section 17, and conveyed away from the storage 30. The discharging hopper 41 is arranged at the forefront of the conveyor belts 35, and the trays 3 in which the sealing plates 1 are loaded are stacked in the discharging hopper 41.

The discharging hopper 41 has an opening on its lower end, and the tray 3 conveyed by the conveyor belt 35 is lifted in the discharging hopper 41 by a not shown lifer to be stacked. Specifically, when the tray 3 conveyed by the conveyor belt 35 reaches underneath the discharging hopper 41, the conveyor belt 35 is temporarily stopped, and the tray 3 is lifted by the lifter in the discharging hopper 41. In the discharging hopper 41, the tray 3 is supported by anti-drop stoppers.

As described, the sealing plates 1 formed by the press forming method are loaded on the conveyor belt 27 one by one between the crosspieces 27a. The sealing plates 1 are sequentially conveyed to the storage 30, and the storage 30 is lifted one step each time the sealing plate 1 is inserted into the storage 30 from the conveyor belt 27. Specifically, the sealing plates 1 are stored in the shelves 31 of the storage 30 at intervals identical to those of (the U-shaped grooves 10 of) the shelves 8 of the tray 3. Therefore, the sealing plates 1 can be transferred from the storage 30 to the tray 3 opposed to the storage 30. That is, the sealing plates 1 are also stored in the tray 3 at regular intervals. For this reason, in the washing tank, the cleaning fluid is allowed to flow through clearances between the sealing plates 1 to remove the metallic dusts effectively from the sealing plates 1. In addition, in the drying process, the cleaning fluid adhering to the sealing plates 1 by surface tension may be eliminated effectively. As a result, the sealing plates 1 can be maintained to the same quality. Further, since a plurality of the sealing plates are stored in the tray 3, a plurality of the sealing plates can be washed at one time. For this reason, a cost and man-hour for manufacturing the sealing plates 1 can be reduced, and the sealing plates 1 can be manufactured in mass quantities.

In addition, since a plurality of shelves 8 are formed in the tray 3, a greater number of the sealing plates 1 may be stored in the tray 3 having dimensions in conformity with dimensions of the washing tank. That is, a greater number of sealing plates 1 may be washed at one time. In addition, the conveying lanes 23 include the conveying lane 23 for conveying the sealing plates 1 to one of the shelves 8, and the conveying lane 23 for conveying the sealing plates 1 to the other one of the shelves 8. Therefore, different processes can be carried out simultaneously. For example, the sealing plates 1 may be loaded into one of the storages 30 from one of the conveying lanes 23 while unloading the sealing plates 1 from the other one of the storages 30 onto the other one of the conveying lanes 23. For this reason, a required time to load the sealing plates 1 into the tray 3 may be reduced. In other words, the sealing plates 1 can be manufactured in mass quantities.

Furthermore, the opening 6 is formed on the back plate 7 of the tray 3. Specifically, the opening 6 is formed on the back plate 7 at a site corresponding to a longitudinally intermediate portion of the sealing plates 1 stacked in the tray 3. Therefore, it is possible to reduce the flowing resistance of the cleaning fluid flowing through the stack of the trays 3 from the top tray 3 toward the bottom tray 3. For this reason, the tray 3 can be washed efficiently at a washing section where the cleaning fluid flows. In addition, the sealing plates 1 may be dried efficiently in the draying process after the cleaning process. In addition, since the plurality of the trays 3 individually storing a plurality of the sealing plates 1 can be washed at one time, the sealing plates 1 may be washed more efficiently.

The present invention should not be limited to the described foregoing example. For example, instead of the tray shown in FIG. 2, three or more shelves may also be formed in parallel to one another in the tray. Further, the sealing plates may also be transferred from the storage to the tray by opposing the tray to the storage, and by pulling down the tray and the storage together in a direction in which the storage is to be laid on the tray. Furthermore, the sealing plates may also be transferred from the conveyor belt to the storage by placing the storage at an angle in front of the conveyor belt to receive the sealing plates dropping from the forefront of the conveyor belt.

The invention claimed is:

1. A plate material conveying system, in which a plurality of plate materials conveyed from a pressing section are aligned in array in the same orientation at regular intervals to be loaded into a tray, and in which the plate materials loaded into the tray are conveyed by conveying the tray, characterized by comprising:
   a feeding section that feeds the plate materials from the array of the plate materials contacted to one another on a predetermined flat site one by one at regular intervals;
   a storage section that has a plurality of shelves into which the plate materials conveyed sequentially from the feeding section are inserted, and that lifts one step in a direction perpendicular to a conveying direction of the feeding section to align an empty space of the shelf to the following plate material each time the plate material is inserted into the shelf;
   wherein the tray comprises a plurality of support members into which side edges of the plate materials are inserted at same intervals as the plate materials stored in the shelf of the storage section;
   a loading section that loads the plate materials stored in the storage section on the tray at one time by opposing the tray to the storage section in which a predetermined number of the plate materials are stored, and by moving the storage section toward the tray; and a discharging section that conveys the tray on which the plate materials are loaded from a site to be opposed to the storage section to a predetermined site.

2. The plate material conveying system as claimed in claim 1, further comprising a tray conveying section including:

a feeding hopper in which the empty trays are stacked;

a conveyor belt that conveys the tray discharged from the feeding hopper to the storage section; and an erecting device that erects the tray to oppose the tray to the storage section.

3. The plate material conveying system as claimed in claim 2, wherein the loading section comprises a pushing mechanism that pushes the plate materials loaded on the shelf of the storage section toward the tray opposed to the storage section at one time from an opposite side to the tray.

4. The plate material conveying system as claimed in claim 1, wherein the storage section is configured to store the plate material by supporting the side edges of the plate material conveyed from the feeding section to the shelf, and lifting the shelf upwardly one step.

5. The plate material conveying system as claimed in claim 1, wherein the tray comprises a plurality of shelves to store the plate materials, same number of the feeding sections and the storage sections as the shelves of the tray are arranged, the feeding section comprises a loading device that loads predetermined number of the plate materials conveyed from the pressing section onto the storage sections alternately, and the discharging section comprises a sliding mechanism that moves the tray in which the plate materials are loaded into one of the shelves from one of the storage sections to a site to be opposed to the other one of the storage sections.

6. The plate material conveying system as claimed in claim 1, wherein the support member of the tray includes a rack bar having a groove into which the side edge of the plate material is inserted, the tray comprises an opening formed on an opposite side to the storage section at a site corresponding to a longitudinally intermediate portion of the plate materials in which both side edges are inserted into the grooves, and one end of the groove opposed to the storage section is open, and the other end of the groove opposite to the storage section is closed.

* * * * *